United States Patent [19]

Smith et al.

[11] Patent Number: 4,592,901

[45] Date of Patent: Jun. 3, 1986

[54] METHOD OF REMOVING SUSPENDED SOLIDS FROM PHOSPHORIC ACID

[75] Inventors: Hudson C. Smith; Wesley W. Atwood; John S. Myrick; Samuel F. Sweat, all of Lake City, Fla.

[73] Assignee: Occidental Petroleum Corporation, Los Angeles, Calif.

[21] Appl. No.: 647,981

[22] Filed: Sep. 6, 1984

Related U.S. Application Data

[63] Continuation of Ser. No. 206,785, Nov. 14, 1980, abandoned, which is a continuation-in-part of Ser. No. 827,741, Aug. 25, 1977, Pat. No. 4,235,854, which is a continuation of Ser. No. 744,229, Nov. 23, 1976, abandoned, which is a continuation of Ser. No. 571,855, Apr. 25, 1975, abandoned.

[51] Int. Cl.$^4$ ............................................. C01B 25/16
[52] U.S. Cl. ................................... 423/320; 210/777; 423/319; 423/321 R
[58] Field of Search ................ 210/777, 778; 423/319, 423/320, 321 R

[56] References Cited

U.S. PATENT DOCUMENTS 3,642,439  2/1972  Moore et al. ................... 423/321 R
4,235,854  11/1980  Smith et al. ..................... 423/321 R

OTHER PUBLICATIONS

Perry, *Chemical Engineers' Handbook*, Third Edition (1950), pp. 976–980, McGraw-Hill Book Co., Inc.

*Primary Examiner*—John Doll
*Assistant Examiner*—Wayne A. Langel
*Attorney, Agent, or Firm*—Christie, Parker & Hale

[57] ABSTRACT

A process for removing impurities from phosphoric acid, especially concentrated wet process phosphoric acid, comprises filtering phosphoric acid through a filter cake (e.g., diatomite) on a porous member at a temperature in the range of about 57° C. to about 77° C. The filter cake retains some phosphate values. A major portion of the phosphate values retained by the filter cake can be introduced into the phosphoric acid manufacturing process, as by slurrying the filter cake in water, separating the aqueous phase from the solid phase, and introducing the aqueous phase to a wet process phosphoric acid process (e.g., as a "gypsum" filter wash).

11 Claims, 1 Drawing Figure

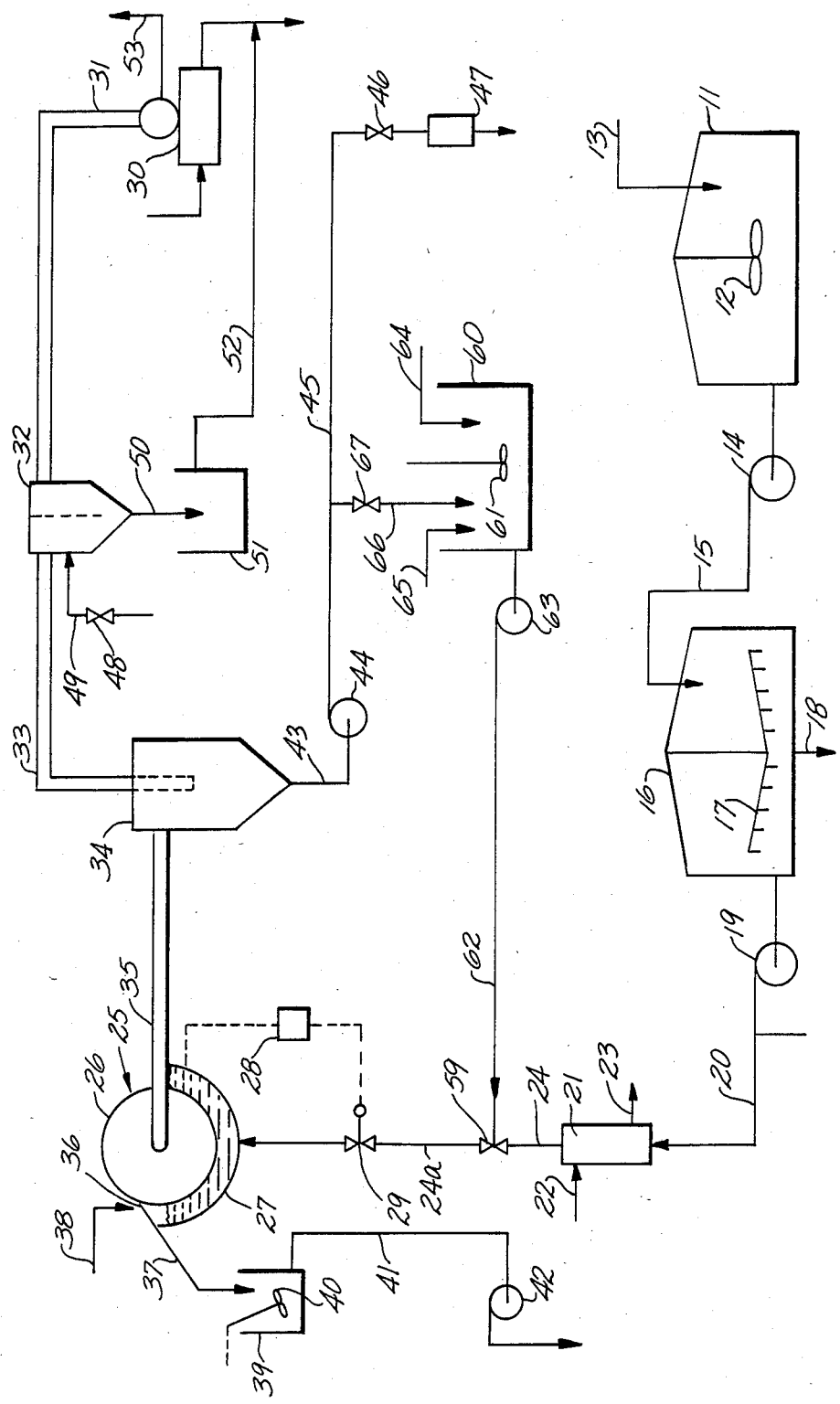

METHOD OF REMOVING SUSPENDED SOLIDS FROM PHOSPHORIC ACID

CROSS REFERENCE TO RELATED APPLICATIONS

This is a continuation of application Ser. No. 206,785 filed Nov. 14, 1980, now abandoned, which application is a continuation-in-part of U.S. application Ser. No. 827,741, filed Aug. 25, 1977 (now U.S. Pat. No. 4,235,854 issue Nov. 25, 1980; which is a continuation of U.S. application Ser. No. 744,229, filed Nov. 23, 1976, now abandoned; which is a continuation of U.S. application Ser. No. 571,855, filed Apr. 25, 1975, now abandoned. The disclosure of all of these parent applications is hereby incorporated herein.

This application is also related to commonly owned U.S. patent applications Ser. No. 954,647, filed Oct. 25, 1978 (now U.S. Pat. No. 4,243,643 issued Jan. 6, 1981) of Mills; U.S. Ser. No. 169,078 filed July 15, 1980 (now U.S. Pat. No. 4,313,919 issued Feb. 2, 1982) of T. E. Richards, J. P. Harvey and M. A. Daigle, titled "Process for Removing Fine Solids from Phosphoric Acid by Volume Filtration"; and Ser. No. 153,880 filed May 28, 1980, (now U.S. Pat. No. 4,303,544 issued Dec. 1, 1981) titled "Improved Rotary Vacuum Precoat Filter" of the said Richards, Harvey and Daigle.

BACKGROUND OF THE INVENTION

This invention relates to wet process manufactured phosphoric acid and more particularly to a method for purifying wet process manufactured phosphoric acid.

The bulk of phosphoric acid is produced by the so-called wet process method. Although there are a wide variety of wet process methods, they all basically comprise the acidulation of phosphate bearing rock with sulfuric acid which results in the precipitation of calcium sulfate and the release of crude phosphoric acid. The crude acid thus produced from the so-called "gypsum" method contains from 22 to 34 percent (as $P_2O_5$) phosphate (the "hemihydrate" method produces about 30% to about 45% $P_2O_5$ acid) and is subsequently concentrated by evaporation to a phosphate content (expressed as $P_2O_5$) of about 50% (e.g., "merchant grade"). The concentrated crude phosphoric acid is subsequently utilized in the production of fertilizers or is subsequently treated to produce high grade phosphoric acid or other phosphates.

Another process called the "furnace process" involves reduction of beneficiated phosphate rock in an electric furnace to produce phosphorous, which is then oxidized to $P_2O_5$. The $P_2O_5$ is dissolved in water to make aqueous phosphoric acid. Another process involving reduction and oxidation, in a rotary kiln, is that of U.S. Pat. No. 3,241,917 to Lappel.

The crude phosphoric acid is relatively high in impurities including aluminum, magnesium and iron complexes. These impurities, which are suspended in the crude acid solution, are not normally removed during the acid manufacturing process, nor are they removed by holding the crude acid in a settling tank for a commercial reasonable time, i.e., on the order of 48 to 60 hours. Consequently, the impurities are encountered in the form of a sludge in the bottom of a tank car after shipping the acid from the manufacturing site to the customer's location. The presence of this sludge often results in the rejection of the shipment by the customer or in the loss of a substantial portion of the crude acid when decantation of the clear acid is attempted.

In addition to the above impurities, crude acid contains substantial proportions of fluorine. The presence of fluorine is considered undesirable, particularly if the phosphoric acid is to be used for purposes other than in the production of fertilizer.

Certain present methods for purifying the crude phosphoric acid, such as, for example, the addition of potassium ferro cyanide to remove iron and vanadium or the use of sodium silicate to remove fluorine, add substantially to the expense of manufacturing the crude acid.

SUMMARY OF THE INVENTION

The present invention is concerned with an economical method for purifying crude phosphoric acid produced by the wet process method. The method is utilized at the site of the acid manufacturer and does not add significantly to the cost of producing crude phosphoric acid. Crude phosphoric acid treated in accordance with the present invention is sufficiently pure, after treatment, to enable it to be shipped or stored for significant periods of time without any substantial sludge formation caused by the settling out of dispersed impurity particles.

The invention involves filtering wet process produced phosphoric acid through a filter cake (such as diatomite) on a porous medium at an elevated temperature, typically in the range of about 57° C. to about 77° C., whereby the filter cake retains solid impurities and some phosphate values, and, in one embodiment, recovering a major portion of the water soluble phosphate values retained by the filter cake, as by reintroducing them into the acid manufacturing process (e.g., the phosphate values in aqueous solution can be used as a wash stage for a gypsum or hemihydrate filter).

In one embodiment, the invention comprises a process for removing particulate impurities from phosphoric acid (typically a wet process phosphoric acid more preferred a concentrated, wet process phosphoric acid) comprising the steps of:

(a) forming a filter cake comprising a filter aid (such a diatomite) on a surface of a porous support member;

(b) maintaining the phosphoric acid containing particulate impurities at an elevated temperature, typically of from about 57° C. to about 77° C. (to increase filtration rates and/or particle settling rates over ambient);

(c) filtering said phosphoric acid at an elevated temperature through the formed filter cake, whereby said particulate impurities and some of the phosphate values in said phosphoric acid are retained by the filter cake; and (d) removing (e.g., continuously) an impurity-containing upper portion of the filter cake to expose a fresh surface of the filter cake to the phosphoric acid which is being filtered.

Another embodiment involves the additional steps:

(e) forming an aqueous slurry of said removed portion of said filter cake, said slurry comprising a liquid phase containing phosphate values and a solid phase comprising the filter aid (e.g., diatomite) and particulate impurities; and (f-1) introducing said slurry into a phosphoric acid manufacturing process; or, (f-2) separating the liquid phase from the solid phase to recover a liquid containing a major portion of the phosphate values retained by the filter cake (this liquid comprises relatively dilute phosphoric acid which can be returned to the acid manufacturing process or used in fertilizer manufacture) and (g) using the recovered liquid in a phosphoric acid manufacturing process, e.g., as a filter wash or in the dissolution of phosphate rock.

The invention is especially concerned with an economical method for purifying crude phosphoric acid produced by the wet process method. The method is preferably utilized at the site of the acid manufacturer. Crude wet process phosphoric acid treated in accordance with the present invention can be sufficiently pure, after treatment according to the invention, to enable it to be shipped or stored for significant periods of time without any substantial sludge formation caused by the settling out of dispersed impurity particles.

To these ends the method of the present invention comprises intermittently contacting a portion of a filter element containing an overlying layer of diatomite filter cake with crude phosphoric acid maintained at a temperature between about 57° C. and about 77° C. while maintaining reduced pressure on the side of the filter element opposite the filter cake. A substantial portion of the dispersed solid impurities is retained in the outer portion of the filter cake and a substantial portion of the fluorine in the crude phosphoric acid undergoes an in situ reaction with the siliceous portion of the diatomite and is likewise retained in the filter as a fluorosilicate. Following contact with the crude phosphoric acid, the outer portion of the filter cake is removed to expose a fresh filtering surface for subsequent acid contact. The removed portion of the filter cake preferably contains a major portion of the solid impurities removed by the filtration of the acid. These retained solids contain a substantial phosphate content of which a major portion can be recovered by slurrying the removed portion of the filter cake and reintroducing the slurry into the acid manufacturing process.

The impure phosphoric acid can be from any source and any concentration which provides acceptable filter rates at temperatures up to about 77° C. Especially preferred are acids that have been treated by the process of U.S. Pat. No. 4,136,199 and U.S. patent application Ser. No. 954,647 to Mills involving addition of a precipitant comprising compounds of calcium and fluorine to accelerate formation of solids from sludge forming impurities.

Other aspects and advantages of this invention will become apparent from the following detailed description taken in conjunction with the accompanying drawings.

BRIEF DESCRIPTION OF THE DRAWING

The figure is a flow diagram of a process for treating crude wet process phosphoric acid in accordance with the present invention.

DETAILED DESCRIPTION OF THE INVENTION

The present invention is embodied in a process for removing suspended solid impurities from crude wet process phosphoric acid. In accordance with the present invention, the crude phosphoric acid, hereinafter referred to as feed acid, is preheated and vacuum filtered through a filter aid-filter cake (e.g.. diatomite) to substantially reduce the quantities of suspended solid impurities contained in the feed acid. Preferably the preheating and filtering steps are preceded by an aging and settling operation for removing the heavier, more easily settled impurities from the crude wet process phosphoric acid prior to the filtration step.

Feed acid produced by the wet process contains substantial proportions of impurities such as, for example, fluorine; calcium, determined as $CaO$; sodium, determined as $Na_2O$; $SiO_2$; $SO_4$; iron, determined as $Fe_2O_3$; aluminum, determined as $Al_2O_3$; and magnesium determined as $MgO$. The relative proportions of impurities contained in the feed acid are largely determined by the type of wet processing utilized to produce the feed acid and the nature of phosphate bearing rock from which the feed acid is produced. Sufficient proportions of the impurities remain in the feed acid even after initial aging and settling and after a substantial additional period of aging, separate from the acid in the form of a sludge. It is commercially impractical to hold the feed acid sufficiently long enough to allow the formation and separation of the sludge and consequently the sludge is normally encountered at the user's location, often resulting in rejection of the acid.

In the present invention, it has been found that by preheating the feed acid (or by maintaining hot acid, as from an evaporator at an elevated temperature), followed by vacuum filtration through a filter medium (preferably after at least 24 hours of aging), said filter medium including a filter cake of a phosphoric acid-resistant filter aid such as diatomite, perlite, cellulosic pulp, etc., the sludge-forming impurities can be removed in sufficient quantity to substantially reduce the subsequent formation of sludge during shipping and handling of the phosphoric acid product.

Due to the nature of the dispersed impurities, the filtration of the crude phosphoric acid has been, prior to this invention, considered impractical from a commercial standpoint due to the fact that the sludge-forming impurities quickly blind the filter surface resulting in high head pressures and low filtration rates.

In accordance with this invention, the feed acid is preheated to a temperature above ambient, preferably between about 50° C. to about 77° C. for phosphoric acid analyzing in the range of about 38° to 58° % $P_2O_5$, more preferred between about 57° C. and about 77° C., as it has been determined, for a given $P_2O_5$ analysis, that feed acid temperature is the primary variable affecting filtration characteristics of the crude phosphoric acid. It has been found (particularly for phosphoric acid analyzing about 50% $P_2O_5$) that below about 57° C. the rate of filtration is undesirably low while above about 77° C. excessive fluorine fumes, as $SiF_4$, are evolved. A particularly preferred feed acid temperature has been found to be between about 70° C. and 72° C., e.g., 70° C. to 71° C. Lower temperatures can be used for lower $P_2O_5$ analysis acids (e.g., about 26% $P_2O_5$ acid can be filtered at acceptable rates at a temperature as low as about 100° F. (about 37° C.), preferably, however, at about 100°–120° F. (about 37°–49° C. or higher).

In the filtering operation, vacuum filtration is highly preferred in the present invention. Filtering is carried out through a filter aid (e.g. diatomite) precoat and the filtering preferably is intermittent, as defined herein. That is to say, because the impurities removed from the acid rapidly clog or blind a filter surface, the filtering process is interrupted at frequent intervals to remove the outer portion of the diatomite precoat which contains the impurities, thereupon exposing a fresh filter surface for subsequent filtration (e.g. see further said U.S. applications Ser. Nos. 153,880 filed May 28, 1980 and 169,078 filed July 15, 1982).

The filter design which lends itself most readily to this type of filtration is the vacuum rotary drum filter. Vacuum rotary drum filters are well-known in the art (e.g., see the references in U.S. application Ser. No. 153,880 of Richards et al) and do not per se form a part of the present invention. The rotary drum filter is highly preferred for use in the present invention since its operation particularly lends itself to intermittent filtering contact between the acid and the filter medium and the filte is easily adapted to carry a doctor knife for controllably removing an impurity-containing portion of the filter cake to expose a fresh filtering surface for subsequent filtering contact with the acid.

It should be clear that the intermittent filtering step of the present invention is not restricted to rotary drum filters. Thus, for example, the filtering step may be conducted in a batchwise manner through a table filter or through a vacuum leaf filter with filtration interrupted when the pressure rises to a selected level. At least a portion or all of the filter cake is removed upon completion of each of the filtering steps and a fresh filtering surface prepared.

The filter medium utilized in the process of the present invention is preferably diatomite or perlite, which is prepared as a slurry and placed as a cake over a porous support medium or member. The particle size of the diatomite does not influence to any significant degree the purity of the final product acid although it does influence the filtration rate with coarser grade diatomite exhibiting the higher filtration rate.

In a preferred embodiment of the present invention utilizing a rotary drum filter, best results are obtained using the so-called coarse grade diatomite having a screen analysis of 95%+325% mesh, 50%+150% mesh, 8%+60% mesh and trace amounts+28% mesh. The screen analysis is based upon the United States Standard Sieve Series. In addition, it is sometimes preferred to incorporate cellulose fibers in the diatomite in proportions of least about one part cellulose fiber to about ten parts diatomite on a weight/weight basis.

In addition to the filtration of suspended solid particles from the crude phosphoric acid, it has been found that there is a surprising reduction in the fluorine content of the acid after filtration as compared with the fluorine content prior to filtration. It is believed that the fluorine contained in the acid undergoes an in situ reaction with the silica of the diatomite to form fluorosilicates which are retained in the diatomite filter cake and also to form volatile compounds (e.g., $SiF_4$) which can be passed to a scrubber.

Referring to the figure, a flow diagram for purifying crude phosphoric acid by vacuum filtration in accordance with the preferred form of the present invention is illustrated. An aging tank 11 provided with an impeller 12 communicates with a source of crude phosphoric acid by means of line 13. Transfer pump 14 and line 15 connect the aging tank with a settling tank 16 which is provided with a rake 17 for the removal of solids through line 18 in the bottom of the settling tank. Line 20 and feed pump 19 are provided to move settled acid to a jacketed preheater 21 for heating the acid to the desired filtering temperature. The preheater 21 is connected to a source of steam at line 22 and a condensate line 23 for leading steam and condensed water out of the preheater.

Heated acid is introduced through lines 24 and 24a to a rotary drum filter, indicated generally as 25, which is provided with a rotary drum 26 and a filter tank 27 through which the rotary drum rotates. The level of acid in the filter tank 27 is sensed by a level control sensor 28 which controls a level control valve 29 in line 24a to maintain the proper flow of heated acid from the preheater 21 to the filter tank. A reduced pressure is maintained within the rotary drum 26, by a vacuum pump 30 which communicates with the rotary drum interior through a line 31, a condenser 32, a line 33, a receiver 34, and a line 35.

The rotary drum filter 25 is provided with a doctor blade 36 which is mounted for advancement in response to the rotation of the drum for controllably removing a portion of the diatomite filter cake. The removed filter cake is washed along a trough 37 into a cake slurry tank provided with an agitator 40 by water introduced through slurrying, is conveyed through a line 41 by pump 42 for subsequent separation of the liquid phase comprising water and phosphate values from the solid phase comprising diatomite and sludge-forming impurities. Separation can be performed by any suitable solids/liquid separation techniques, such as by centrifugation and filtration. When centrifuges are used care should be taken to use synthetic materials, such as synthetic rubber coatings which will withstand the corrosive conditions. The liquid phase (e.g., the filtrate) can be returned to the manufacturing process for recovery of a substantial portion of the phosphate values retained in the filter cake.

The filtered acid under vacuum is led into the receiver 34 by the line 35 where vapors are separated from the liquid product acid, which is discharged from the receiver through a line 43, a pump 44 and a line 45 to suitable receiving tanks, not shown, for shipment or further processing. A valve 46 is provided to close the line 45 and flow recorder 47 records the quantity of product acid through the line 45.

The scrubber 32 is provided with a source of scrubbing water through a valve 48 and a line 49 and receives the gaseous materials from the receiver 34 through the line 33. The scrubber liquid is discharged through a line 50 to a seal tank 51 and discharged through a line 52. Uncondensable gases pass through the line 31 and are vented at 53.

A precoat slurry tank 60 provided with an agitator 61 is interconnected to the line 24 by a line 62 by means of three-position valve 59. A pump 63 is provided for moving the slurry from the precoat slurry tank 60 to the filter tank 27. Diatomite and water are introduced into the slurry tank 60 through lines 64 and 65 respectively. A line 66, provided with a valve 67, communicates between the slurry tank 60 and the line 45. During the preparation of the precoat, the valve 59 is moved to a position closing off the line 24 and permitting communication between line 62 and the line 24a for the introduction of slurry to the rotary filter 25. The valve 46 is closed and the value 67 opened so that slurry water and fine diatomite are returned to the slurry tank through the line 35, the receiver 34, the line 43, the line 45 and the line 66.

Although not specifically noted, all pumps, impellers and the like illustrated herein are driven by suitable electric motors.

The following example illustrates a preferred method for purifying crude phosphoric acid produced by the wet process in accordance with this invention.

EXAMPLE

A precoat slurry consisting of one pound of coarse diatomite (including one part cellulose fibers per 10 parts of diatomite) to one gallon water was prepared in the slurry tank 60. Diatomite slurry was pumped by the pump 63 through the line 62 and line 24a to the filter tank 27 of the rotary filter 25 to form a filter cake on the drum 26. The vacuum pump 30 was operated to draw a reduced pressure of 20 inches of mercury at the interior of the porous drum 26. The drum 26 was rotated in a counterclockwise direction and a filter cake of approximately two to three inches in thickness was deposited on the outer surface of the porous drum. Following preparation of the filter cake, the remaining slurry in the filter tank 27 was flushed out of the tank and the doctor blade 36 was set to advance a distance of about 0.005 inch per drum revolution. The valves 59 and 67 were closed and the valve 59 moved to a position for closing line 62 and for providing communication between the lines 24 and 24a. Valve 46 was also opened in preparation for filtering acid.

The feed acid was manufactured from North Florida phosphate rock in a Dorr-Oliver plant with a continuous, circular reactor. The feed acid was concentrated in a forced circulation evaporator to a phosphate content of about 50% and was fed directly from the evaporator through the line 13 to the aging tank 11 where it was held with agitation for a period of 24 to 48 hours. During this period, the acid was cooled from its manufacturing temperature of 74° C. to about 54° C. The aged feed acid was then transferred through the line 15 by pump 14 to the settling tank 16 where it was held an additional 24 hours to allow the heavier solid particles to settle.

Following the settling step, the acid was pumped from the settling tank 16 passing first through the preheater 21 where it was heated to a temperature between 70° and 71° C. and then to the filter tank 27 of the rotary drum filter 25.

A vacuum of about 25 inches of mercury was drawn in the interior of the drum 26 by the vacuum pump 30, drawing the acid through the diatomite filter cake where impurities were removed, with the filtered acid being collected and moved to the receiver 34 through the line 33 where the gaseous and liquid components were separated as described above. The drum rotation was maintained at one rpm and upon each rotation of the drum the doctor blade 36 was advanced to remove the outer portion of the filter cake. The removed outer portion of the filter cake was collected in the cake slurry tank 39.

The collected portions of the filter cake in the cake slurry tank 39 were maintained with constant agitation until sufficient quantity was collected for filtration through a gypsum filter located in the phosphoric acid plant. Analysis of the filtrate indicated that 85% of the phosphate content in the removed portions of the filter cake were recovered in the filtrate which was returned to the phosphoric acid plant for reprocessing.

A typical analysis of the phosphoric acid before and after filtering an accordance with the present invention is set forth in Table A below.

TABLE A

| Analysis | Typical Analysis Crude Phosphoric Acid - Percent by Weight | |
|---|---|---|
| | Before Filtering | After Filtering |
| $P_2O_5$ | 48.55% | 49.87% |
| Total Solids | 6.20% | 0.50% |
| F | 2.08% | 0.70% |
| CaO | 1.20% | 0.07% |
| $Na_2O$ | 0.35% | 0.10% |
| $SiO_2$ | 0.15% | 0.20% |
| $SO_4$ | 4.55% | 3.25% |
| $Fe_2O_3$ | 1.34% | 0.92% |
| $Al_2O_3$ | 1.50% | 1.16% |
| MgO | 0.68% | 0.27% |

From the foregoing analysis it can be seen that a substantial purification of the acid was obtained after treatment in accordance with the present invention. In particular, the solids were substantially reduced to a level below that which is normally obtained when the product is centrifuged or otherwise treated to remove solids.

The filtered product is substantially more stable with regard to the formation of sludge and the reduction in fluorine content is of great advantage, particularly when the acid is to be used for other than fertilizer production.

In subsequent filtration runs utilizing crude phosphoric acid having solids content as low as 2%, no substantial difference in filtration rate or in product quality was noted. It is within the scope of the present invention, therefore, to filter crude phosphoric acid directly from the manufacturing process, eliminating the aging and settling steps, although aging and settling, particularly with pretreatment as in U.S. Pat. No. 4,136,199 and U.S. application Ser. No. 954,647 is preferred.

An especially useful process comprises adding to wet process phosphoric acid, especially acid concentrated to at least 48% $P_2O_5$, a precipitant comprising ionic calcium and fluoride (as in U.S. patent application Ser. No. 954,647 and U.S. Pat. No. 4,136,199) and allowing solids to form comprising magnesium impurities in the acid, then filtering the solids containing acid (as described herein) at an elevated temperature through a filter cake comprising perlite or diatomaceous earth while displacing with an aqueous fluid spray (as in U.S. patent applications Ser. Nos. 153,880 and 169,078) part of the $P_2O_5$ values which become retained in the cake, then removing a solid impurity—containing outer portion of the filter cake to expose a fresh surface of the cake. Residual $P_2O_5$ values not displaced by the spray, but retained in the removed cake layer can be recovered by the means disclosed herein (e.g., by making an aqueous slurry of the removed filter cake [as in pond water] and separating the liquid portion of the slurry which contains said $P_2O_5$ values.)

While the invention has been described in connection with specific embodiments thereof, it will be understood that it is capable of further modification, and this application is intended to cover any variations, uses or adaptations of the invention. It will, therefore, be recognized that the invention is not to be considered as limited to the precise embodiment shown and described but is to be interpreted as broadly as permitted by the patent laws.

What is claimed is:

1. A process for removing particulate impurities from phosphoric acid comprising the steps of:
   (a) forming a filter cake comprising diatomite on a surface of a porous support member;
   (b) maintaining phosphoric acid containing particulate impurities at a temperature no greater than about 77° C.;
   (c) filtering said phosphoric acid through the formed filter cake, whereby said particulate impurities and some of the phosphate values in said phosphoric acid are retained by an outer portion of the filter cake;
   (d) removing the impurity-containing outer portion of the filter cake to expose a fresh surface of the filter cake to the phosphoric acid which is being filtered;
   (e) forming an aqueous slurry of said removed outer portion of said filter cake, said slurry comprising a liquid phase containing phosphate values and a solid phase comprising diatomite and particulate impurities; and
   (f) separating the liquid phase from the solid phase to recover a liquid containing a major portion of the phosphate values retained by the outer portion of the filter cake.

2. In the wet process for manufacturing phosphoric acid by acidulation of phosphorus-bearing rock with sulfuric acid to precipitate calcium sulfate and to release crude phosphoric acid containing solids-forming impurities and thereafter concentrating said crude impurity-containing phosphoric acid to produce a concentrated phosphoric acid containing suspended particles formed from said solids-forming impurities, the improvement comprising the steps of:
   (a) forming a filter element consisting essentially of a diatomite filter cake precoating overlying an outer surface of a porous support member;
   (b) contacting at least a portion of an outer surface of said filter cake with said concentrated phosphoric acid at a temperature in the range of about 57° C. to about 77° C., while maintaining reduced pressure on an inner surface of said porous support member to filter said concentrated phosphoric acid through said filter cake to remove at least a portion of the suspended particles from said concentrated phosphoric acid, said removed particles and a portion of the phosphate values from the concentrated phosphoric acid being retained in the contacted outer surface portion of said filter cake;
   (c) collecting said acid after filtration;
   (d) removing the contacted portion of said outer surface of said filter cake containing said retained solids, after each said contact thereof by said acid, to present relatively fresh outer filter cake surface for subsequent concentrated phosphoric acid contact;
   (e) forming an aqueous slurry of said removed portion; and
   (f) introducing said slurry into a phosphoric acid manufacturing process.

3. A process for removing impurities from wet process phosphoric acid comprising the steps of:
   (a) maintaining wet-process produced phosphoric acid containing particulate impurities at a temperature of from about 57° C. to about 77° C.;
   (b) filtering said phosphoric acid through a filter cake to remove particulate impurities from said phosphoric acid, at least a portion of said filter cake retaining phosphate values;
   (c) forming an aqueous slurry comprising removed particulate impurities and a portion of said filter cake retaining phosphate values; and
   (d) reprocessing said aqueous slurry by separating liquid from said slurry to recover an aqueous phase containing a major portion of the phosphate values retained by the filter cake.

4. The process of claim 1 wherein said diatomite filter cake contains cellulose fibers.

5. The process of claim 2 wherein said concentrated phosphoric acid analyzes about 50% $P_2O_5$ by weight.

6. The process of claim 2 wherein said phosphoric acid was produced by the wet process.

7. The process of claim 2 wherein said filter aid comprises diatomite.

8. The process of claim 2 wherein in step (b) said concentrated phosphoric acid is maintained within said temperature range for a period of at least 24 hours.

9. The process of claim 9 wherein said period is in the range of 24 to 48 hours.

10. The process according to claim 3 wherein said aqueous phase is used as a filter wash in a phosphoric acid manufacturing process.

11. The process according to claim 3 wherein said aqueous phase is used in the dissolution of phosphate rock in a phosphoric acid manufacturing process.

* * * * *